United States Patent
Watanabe (10) Patent No.: US 7,082,354 B2
(45) Date of Patent: Jul. 25, 2006

(54) FUEL FLUID COUPLING

(75) Inventor: Yasuhiro Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 316 days.

(21) Appl. No.: 10/432,595

(22) PCT Filed: Oct. 2, 2002

(86) PCT No.: PCT/JP02/10264

§ 371 (c)(1),
(2), (4) Date: Oct. 29, 2003

(87) PCT Pub. No.: WO03/032425

PCT Pub. Date: Apr. 17, 2003

(65) Prior Publication Data

US 2004/0067398 A1    Apr. 8, 2004

(30) Foreign Application Priority Data

Oct. 2, 2001  (JP) ............................. 2001-306288
Sep. 13, 2002 (JP) ............................. 2002-267843

(51) Int. Cl.
*G05D 7/00* (2006.01)
*G06F 1/00* (2006.01)
(52) U.S. Cl. .................... 700/282; 700/275; 702/45
(58) Field of Classification Search ............... 700/275, 700/282; 702/45
See application file for complete search history.

(56) References Cited

U.S. PATENT DOCUMENTS

| 4,304,823 A * | 12/1981 | Lemelson ................... 429/19 |
| 5,964,089 A * | 10/1999 | Murphy et al. ............... 60/286 |
| 6,416,893 B1* | 7/2002 | Clingerman et al. .......... 429/17 |
| 2002/0117123 A1* | 8/2002 | Hussain et al. ................ 123/3 |

FOREIGN PATENT DOCUMENTS

| JP | 9-22711 | 1/1997 |
| JP | 11-7972 | 1/1999 |
| JP | 2002-161997 | 6/2002 |
| JP | 2002-321682 | 11/2002 |
| WO | 98/19960 | 5/1998 |
| WO | 00/69773 | 11/2000 |

* cited by examiner

Primary Examiner—Jayprakash N. Gandhi
(74) Attorney, Agent, or Firm—Oblon, Spivak, McClelland, Maier & Neustadt, P.C.

(57) ABSTRACT

A fluid fuel mediator connectable to a fluid fuel server and/or a power generator includes a fluid fuel inlet and/or a fluid fuel outlet, a storage vessel having a storage material which storages a fluid fuel, and at least one of an information memory, an information indicator, and an information transmitter. Pieces of information to be stored, displayed, or transmitted include information on a necessary filled amount, information on the number of times of filling, information on a flow rate of the fluid fuel, information on a residual amount of the fluid fuel, and information on the kind of the storage material. The fuel gas mediator has a temperature control mechanism.

16 Claims, 6 Drawing Sheets

FUEL FLUID COUPLING

TECHNICAL FIELD

The present invention relates to a fuel gas mediator used for a system for delivering a fuel gas to a fuel cell stack such as a so-called hydrogen delivery system.

BACKGROUND ART

Fuel cell stacks are devices for generating an electromotive force from power generators by supplying hydrogen as a fuel gas and oxygen (air) thereto. In general, a fuel cell stack has a structure that an electrolyte film (proton conductive film) of each fuel cell is held between gas electrodes and is operable to obtain a desired electromotive force. Such fuel cell stacks have been greatly expected as applicable to electric cars and hybrid type vehicles and actually developed toward the practical use. In addition to these applications, fuel cell stacks are being studied to be usable in new applications quite different therefrom, for example, as new power sources for portable electric equipment in place of the existing dry cells and chargeable batteries by making effective use of advantages of the fuel cell stacks in terms of easy reduction in weight and size.

By the way, in each of the above-described applications, it is required to simply, stably deliver hydrogen representative of a fuel gas to a fuel cell stack, and more specifically, it is essential to construct a so-called hydrogen delivery system.

In the case of constructing such a hydrogen delivery system, it is important to ensure an interface between a fuel gas server (hydrogen server) and a fuel cell stack. For example, in the case of constructing a hydrogen delivery system of a structure that hydrogen is delivered from a hydrogen server to power generators of a fuel cell stack via a fuel gas storing unit configured as a fuel cartridge, it is essential to acquire pieces of information on the necessary filled amount, optimum flow rate of the fuel gas, kind of a storage material used for the fuel cartridge, and the like, and it is required to suitably control the hydrogen server and the like on the basis of these pieces of information.

The hydrogen delivery system of such a type also requires the temperature control of the fuel cartridge and the like. In the case of using storage/release of a fuel gas (hydrogen gas) in/from a storage material for delivering the fuel gas, since the storage material generally becomes exothermic at the time of storage of the fuel gas and endothermic at the time of release of the fuel gas, it is desirable to control the temperature of the fuel cartridge on the basis of whether the storage material is in the exothermic state or in the endothermic state.

The present invention has been made to meet these various requirements. Accordingly, an object of the present invention is to provide a new fuel gas mediator having functions of storing, displaying, and transmitting various kinds of information. Another object of the present invention is to provide a fuel gas mediator capable of performing the temperature control thereof.

DISCLOSURE OF INVENTION

A fuel gas mediator of the present invention is able to store, display, and transmit various kinds of information, and hence to suitably control a fuel gas server and the like on the basis of these kinds of information. The fuel gas mediator of the present invention is also able to perform the temperature control thereof, more specifically, to readily release, when a storage material in a fuel gas storing unit generates heat by the exothermic reaction, the heat of the storage material.

BRIEF DESCRIPTION OF DRAWINGS

FIGS. 3A and 3B are typical views of a coil spring of a temperature regulating mechanism using a shape memory alloy, wherein FIG. 3A shows a shrinkage state of the coil spring and FIG. 3B shows an extension state of the coil spring;

BEST MODE FOR CARRYING OUT THE INVENTION

A fuel gas mediator to which the present invention is applied will be hereinafter described in detail with reference to the drawings.

Figure 1:
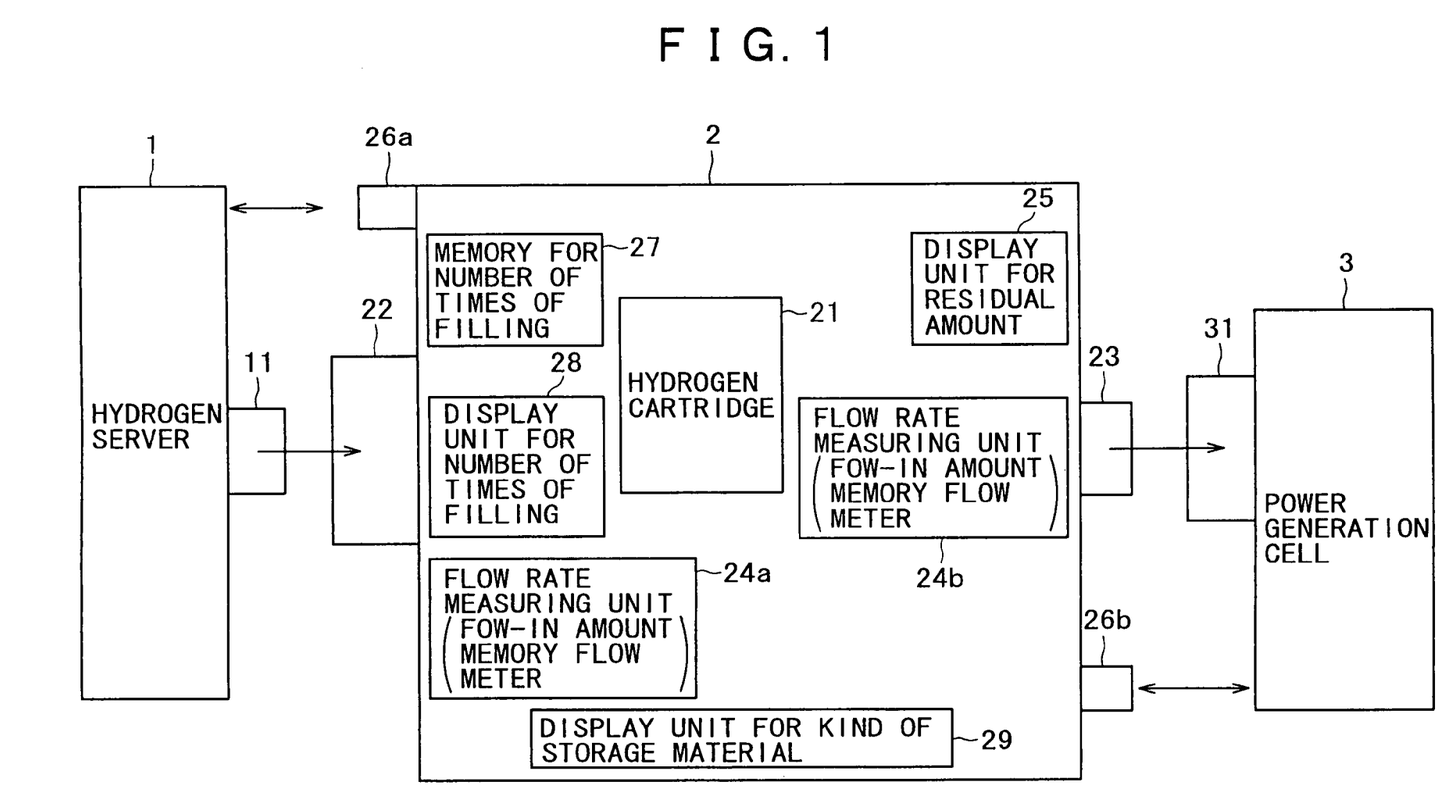
FIG. 1 is a typical diagram showing one example of a hydrogen delivery system using a fuel gas mediator (hydrogen delivery unit) to which the present invention is applied.

FIG. 1 shows one example of a hydrogen delivery system for delivering hydrogen gas representative of a fuel gas from a hydrogen server to power generation cells of a fuel cell stack. The hydrogen delivery system is adapted to deliver hydrogen from a hydrogen server 1 to power generation cells 3 of a fuel cell stack via a hydrogen delivery unit 2 equivalent to a fuel gas mediator.

The hydrogen delivery unit 2 includes a hydrogen cartridge 21 that accommodates a hydrogen storage material for storing/releasing hydrogen gas. A coupling portion 22 of the hydrogen delivery unit 2 is coupled to a coupling portion 11 of the hydrogen delivery 1, to deliver hydrogen gas from the hydrogen server 1 to the hydrogen delivery unit 2. Similarly, a coupling portion 2.3 of the hydrogen delivery unit 2 is coupled to a coupling portion 31 of the power generation cells 3, to deliver hydrogen gas from the hydrogen delivery unit 2 to the power generation cells 3. Accordingly, hydrogen gas delivered from the hydrogen server 1 is once stored in the hydrogen cartridge 21 of the hydrogen delivery unit 2, and is then delivered to the power generation cells 3 at a flow rate adjusted by the hydrogen delivery unit 2.

The hydrogen delivery system thus configured has a feature that the hydrogen delivery unit 2 has functions of storing, displaying, and transmitting various kinds of information. Specifically, the hydrogen delivery unit 2 according to this embodiment functions to store pieces of information, for example, on a necessary filled amount, the number of times of filling, the flow rate of a fuel gas, a residual amount of a fuel gas, and the kind of a storage material, to display these pieces of information, and to transmit these pieces of information to the hydrogen server 1 side or the power generation cell side 3 of the fuel cell stack.

The functions of the hydrogen delivery unit 2 will be more concretely described below. The hydrogen delivery unit 2 has flow rate measuring units 24a and 24b each of which is composed of a flow meter and a flow-in amount memory (or flow-out amount memory). The flow rate measuring unit 24*a* is mounted on the hydrogen gas flow-in side coupled to the hydrogen server 1, and the flow rate measuring unit 24*b* is mounted on the hydrogen flow-out side coupled to the power generation cells 3. In operation, the flow rate of hydrogen gas delivered from the hydrogen server 1 is measured by the flow meter of the flow rate measuring unit 24*a* and is stored in the flow-in amount memory thereof, and similarly the flow rate of hydrogen gas to be delivered to the power generation cells 3 is measured by the flow meter of the flow rate measuring unit 24*b* and is stored in the flow-out amount memory thereof. The residual amount of hydrogen gas in the hydrogen cartridge 21 is calculated on the basis of the data stored in the flow-in amount memory and the flow-out amount memory, and is displayed on a display unit 25 specialized for displaying a residual amount.

A necessary amount of hydrogen gas to be filled in the hydrogen cartridge 21 can be calculated on the basis of the calculated residual amount of hydrogen gas. The hydrogen delivery unit 2 also has an information transmitting unit 26*a* for transmitting information to the hydrogen server 1 and an information transmitting unit 26*b* for transmitting information to the power generation cells 3. The information on the necessary filled amount is transmitted to the hydrogen server 1 via the information transmitting unit 26*a*, and the amount of hydrogen gas to be filled in the hydrogen cartridge 21 is controlled on the basis of the information on the necessary filled amount thus transmitted to the hydrogen server 1.

The hydrogen delivery unit 2 is also able to transmit and display information on the number of times of filling, in addition to the information on the necessary filled amount. The information on the number of times of filling can be acquired by counting the number of times of filling on the basis of the number of times of connection of the hydrogen delivery unit 2 to the hydrogen server 1 or the number of times of operation of the above-described flow meter. For example, each time the hydrogen delivery unit 2 is connected to the hydrogen server 1, the number of times of closing contacts is electrically or mechanically counted and is then stored in a memory 27 specialized for storing the number of times of filling. The information on the number of times of filling thus stored is displayed on a display unit 28 specialized for displaying the number of times of filling, and is transmitted to the hydrogen server 1 side via the information transmitting unit 26*a* at the time of delivering hydrogen gas from the hydrogen server 1 to the hydrogen delivery unit 2 and storing the hydrogen gas in the hydrogen delivery unit 2. The hydrogen server 1 adjusts a delivery pressure or the like to a suitable value on the basis of the information on the number of times of filling thus transmitted. The storage material accommodated in the hydrogen cartridge 21 generally degrades its hydrogen storing ability to some extent after repetition of storage and release of hydrogen. To cope with such an inconvenience, it is desirable to set an optimum delivery pressure in accordance with the degree of degradation of the storage material, and in this case, the adjustment of a delivery pressure based on the information on the number of times of filling is effective.

In the case of exchanging the hydrogen cartridge 21 for a new one, the number of times of filling, which has been counted for the old hydrogen cartridge 21, is reset and the number of times of filling for the new hydrogen cartridge 21 is newly counted. The reset of the information on the number of times of filling may be performed by detecting the removal of the old hydrogen cartridge 21 from the hydrogen delivery unit 2, and resetting the number of times of filling for the old hydrogen cartridge 21 stored in the memory 27.

The hydrogen delivery unit 2 has, in addition to the above-described functions, a function of storing and displaying the information on the kind of a storage material to be accommodated in the hydrogen cartridge 21, and transmitting such information to the hydrogen server 1 and the like. The kind of a hydrogen storage material accommodated in the hydrogen cartridge 21 may often vary an optimum delivery pressure, a fillable capacity, and the like. Accordingly, it is desirable to suitably set a delivery pressure and the like in the hydrogen server 1 in accordance with the kind of a storage material. The kind of a storage material to be accommodated in the hydrogen cartridge 21 is stored in a memory and is displayed on a display unit 29 specialized for displaying the kind of a storage material. When the hydrogen delivery unit 2 is connected to the hydrogen server 1, the information on the kind of a storage material is transmitted to the hydrogen server 1 side via the information transmitting unit 26*a*, and a delivery pressure, a fillable capacity, and the like in the hydrogen server 1 are adjusted on the basis of the information on the kind of a storage material thus transmitted. At this time, the information on the kind of a storage material may be inputted in the memory when the storage material is accommodated in the hydrogen cartridge 21.

The present invention is not limited to the above-described configuration mainly related to the storage, display, and transmission of the information on the hydrogen delivery unit 2 side, but may be configured such that information on the power generation cell 3 side of the fuel cell stack is transmitted to the hydrogen delivery unit 2 side and the hydrogen delivery unit 2 is controlled on the information thus transmitted. To be more specific, the flow rate of hydrogen gas to be delivered from the hydrogen delivery unit 2 to the power generation cells 3 can be adjusted by the hydrogen delivery unit 2 on the basis of information on the necessary flow rate transmitted from the power generation cells 3.

Figure 2:
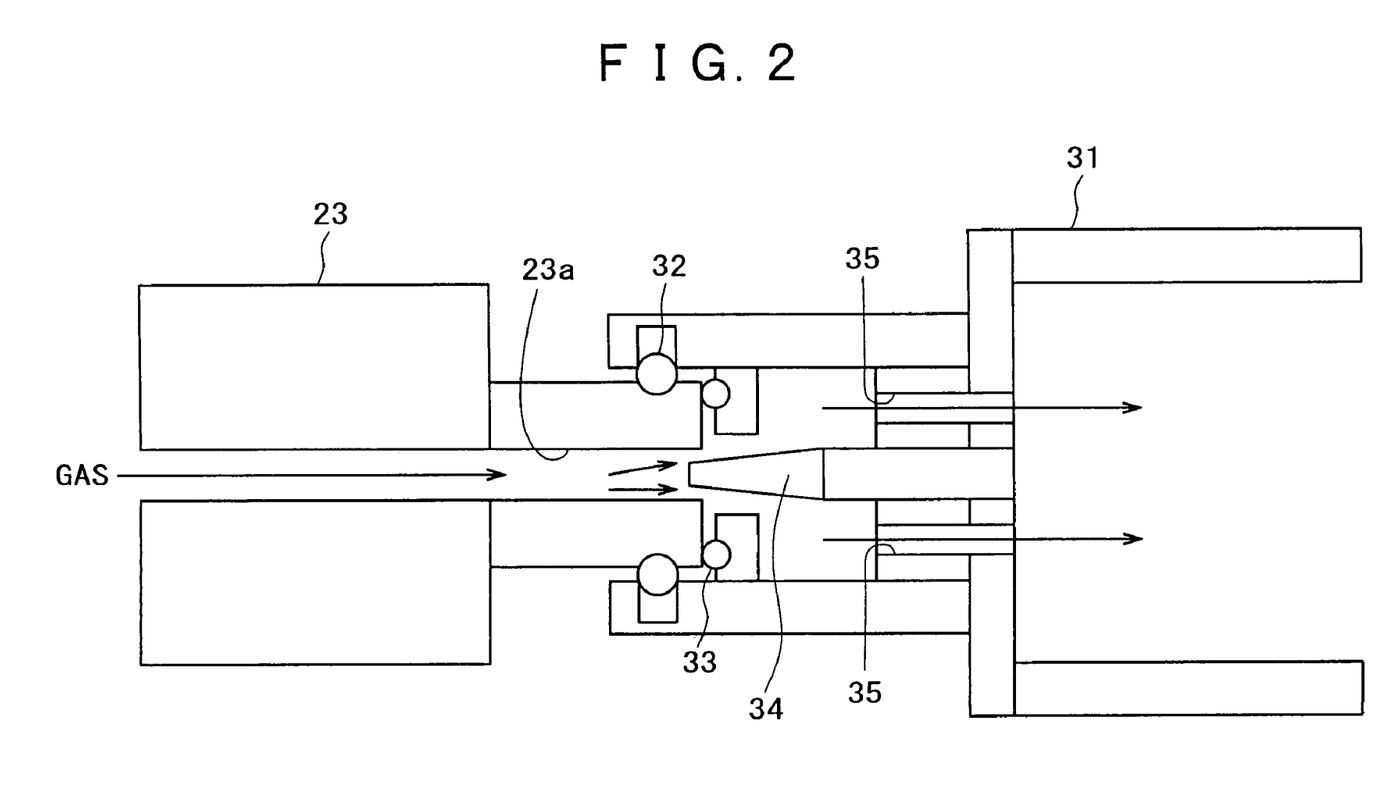
FIG. 2 is a schematic partial sectional view showing one example of a gas flow rate regulating mechanism.

FIG. 2 shows a gas flow rate regulating mechanism provided between the hydrogen delivery unit 2 and the power generation cells 3. The delivery of hydrogen gas from the hydrogen delivery unit 2 to the power generation cells 3 of the fuel cell stack is performed by coupling the coupling portion 23 provided on the hydrogen delivery unit 2 to the coupling portion 31 of the power generation cells 3. A flow passage on the hydrogen delivery unit 2 side is communicated to a flow passage on the power generation cell 3 side by inserting the coupling portion 23 of the hydrogen delivery unit 2 in the coupling portion 31 of the power generation cells 3, and the coupled boundary therebetween is sealed by O-rings 32 and 33. A gas flow rate information pin 34 is provided at the center of the coupling portion 31 of the power generation cells 3, with the leading end thereof inserted in an opening portion 23*a* of the coupling portion 23 of the hydrogen delivery unit 2. Accordingly, hydrogen gas delivered from the hydrogen delivery unit 2 flows through the opening portion 23*a* of the hydrogen delivery unit 2, and passes through a gap between the opening portion 23*a* and the gas flow rate information pin 34, to be delivered to the power generation cells 3 from gas inlets 35 provided in the coupling portion 31 on the power generation cell 3 side.

The leading end of the gas flow rate information pin 34 is tapered, whereby the restriction amount of a needle (opening portion 23*a*) on the hydrogen delivery unit 2 side is determined by the length of the gas flow rate information pin 34 on the power generation cell 3 side. For example, as the length of the gas flow rate information pin 34 on the power generation cell 3 side becomes longer, the gap between the gas flow rate information pin 34 and the opening portion 23a on the hydrogen delivery unit 2 side becomes narrower and thereby the flow rate of hydrogen gas passing therethrough becomes smaller. On the contrary, as the length of the gas flow rate information pin 34 on the power generation cell 3 side becomes shorter, the gap between the gas flow rate information pin 34 and the opening portion 23a on the hydrogen delivery unit 2 side becomes wider and thereby the flow rate of hydrogen gas passing therethrough becomes larger. As a result, by previously determining the length of the gas flow rate information pin 34 on the basis of an optimum flow rate required for the power generation cells 3, the optimum flow rate can be set only by coupling the hydrogen delivery unit 2 to the power generation cells 3.

The hydrogen delivery unit 2 according to this embodiment also includes a temperature control mechanism for detecting and controlling an internal temperature, in addition to the above-described functions of storing, displaying, and transmitting various kinds of information.

Figure 3A:
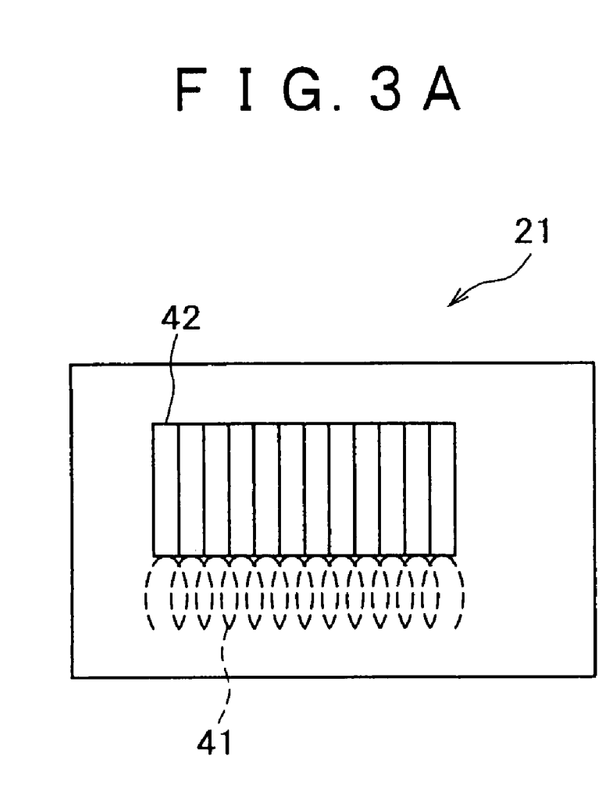
Figure 3B:
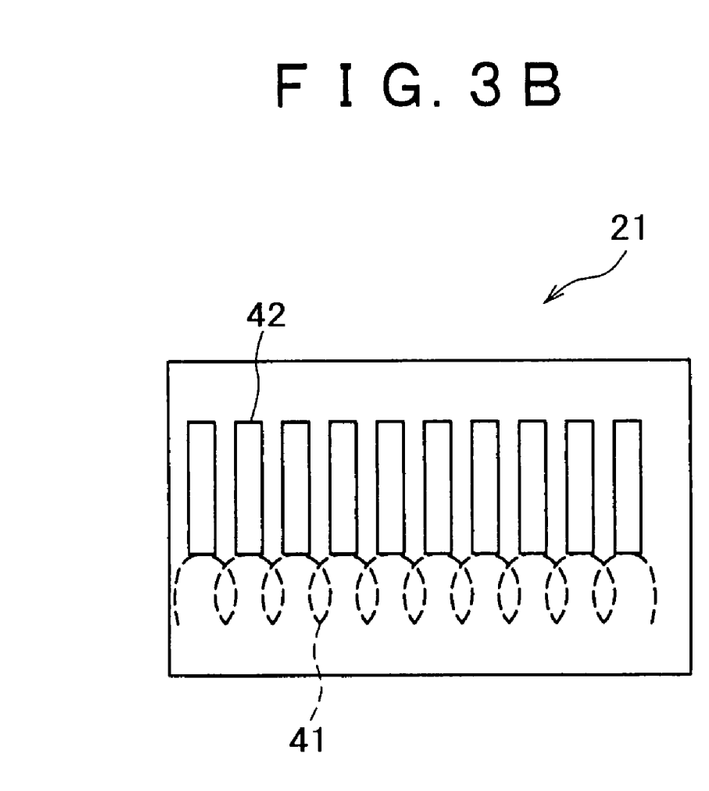

The temperature control mechanism is adapted to detect the internal temperature of the hydrogen delivery unit 2 and control the temperature by adjusting the angle and arrangement gap of components of a heat sink with the use of a bimetal or a shape memory alloy. FIGS. 3A and 3B show one example of the temperature control mechanism of a type using a coil made from a shape memory alloy, wherein FIG. 3A shows a state that the coil is extended (with a gap between adjacent turns widened) when the internal temperature is raised and FIG. 3B shows a state that the coil is shrunk (with the gap between adjacent turns narrowed) when the coil is cooled. As shown in FIGS. 3A and 3B, a number of cooling fins (heat sink) 42 are mounted to respective turns of a coil spring 41 made from a shape memory alloy, which coil has been previously subjected to shape memory treatment, to thereby perform the temperature control.

In a low temperature state, as shown in FIG. 3A, the coil spring 41 of this temperature control mechanism is kept in a shrinkage state in which respective cooling fins 42 are in close-contact with each other, that is, in a so-called closed state. In such a state, the heat radiation efficiency is poor, thereby failing to obtain a sufficient heat radiation effect. On the other hand, as the temperature of the hydrogen delivery unit 2 is raised, as shown in FIG. 3B, the coil spring 41 made form the shape memory alloy is extended, to widen each gap between adjacent two of the cooling fins 42 mounted to respective turns of the coil spring 41, thereby increasing a substantial heat radiation area. As a result, the heat radiation effect is increased, which functions to lower the temperature of the hydrogen delivery unit 2.

In the case of adopting the temperature control mechanism having the above-described structure, however, if the temperature of the hydrogen delivery unit 2 is too low, it is difficult to control the temperature of the hydrogen delivery unit 2. To cope with such an inconvenience, the temperature control may be performed by making use of heat generation of the power generation cells 3. That is to say, the internal temperature of the hydrogen delivery unit 2 in a wide temperature range can be thus controlled by combining the heat radiation mechanism using the coil spring with the heat generation of the power generation cells 3.

Figure 4:
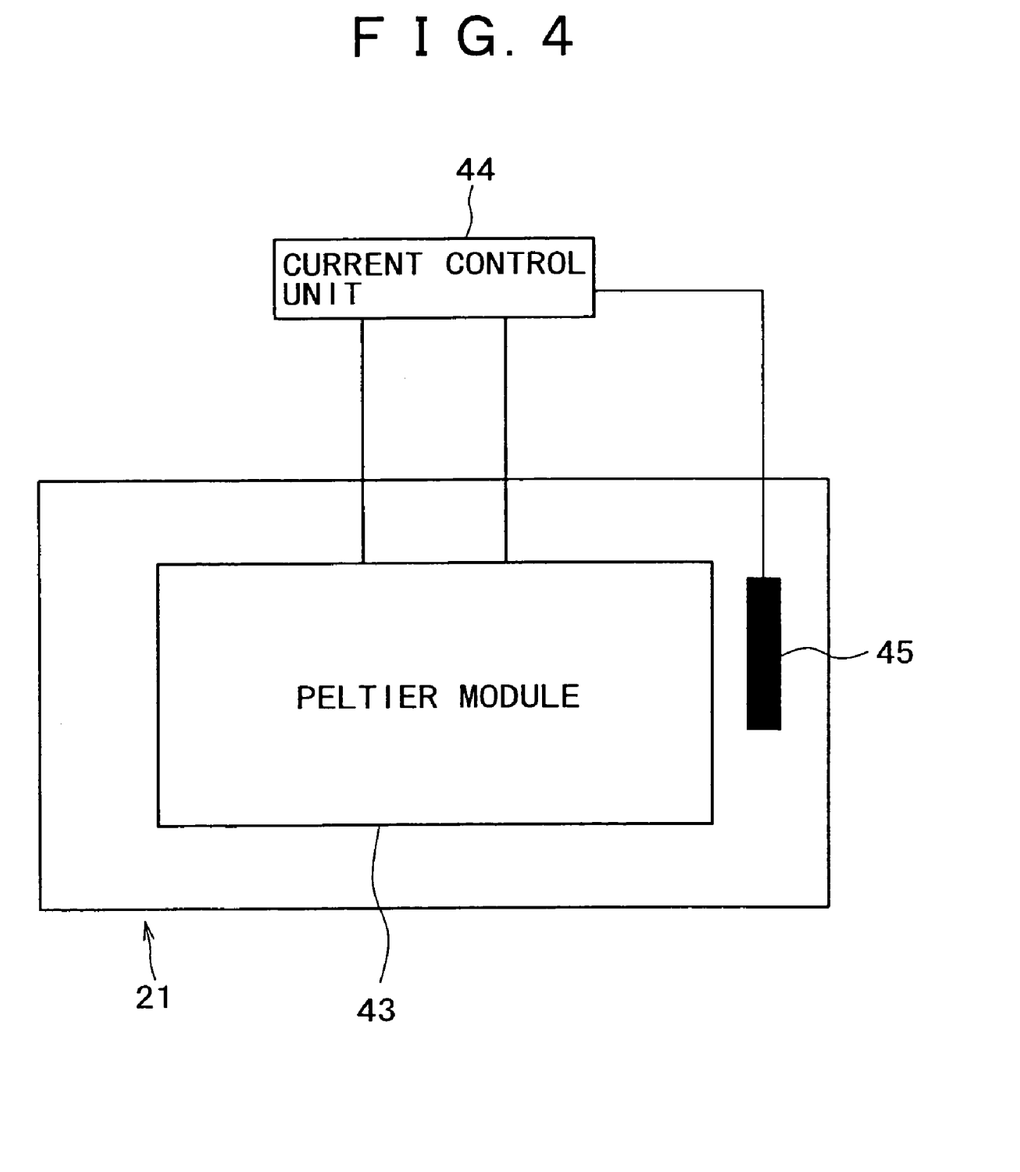
FIG. 4 is a typical view showing another example of the temperature regulating mechanism using a Peltier device.

The temperature control mechanism is not limited to the type described above, but may be of a type in which temperature control is performed by applying a current in a Peltier device. FIG. 4 shows one example of the temperature control mechanism, which makes use of the Peltier device. In this temperature control mechanism, a Peltier module 43 incorporated with the Peltier device is stuck on the surface of the hydrogen delivery unit 2, and a current control unit 44 for controlling a current flowing in the Peltier device is connected to the Peltier module 43. A temperature sensor 45 is stuck on the surface of the hydrogen delivery unit 2. A current flowing in a specific direction is applied to the Peltier device on the basis of temperature information supplied from the temperature sensor 45, to cool or heat the hydrogen delivery unit 2. The cooling and heating of the hydrogen delivery unit 2 can be switched from each other by changing the direction along which the current flow in the Peltier device. To be more specific, if the temperature of the hydrogen delivery unit 2 is high, a current is applied to the Peltier device in a specific direction for cooling the hydrogen delivery unit 2, whereas if the temperature of the hydrogen delivery unit 2 is low, a current is applied to the Peltier device in the reversed direction for heating the hydrogen delivery unit 2.

An example of a sequence of steps of filling the hydrogen cartridge with hydrogen gas will be described below. In this example, the hydrogen cartridge (hydrogen delivery unit 2) is filled with hydrogen gas delivered from the fuel vessel (hydrogen server 1), and more specifically, the portable hydrogen cartridge (hydrogen delivery unit 2) that accommodates a hydrogen storage material is filled with hydrogen gas delivered from the fuel vessel (hydrogen server 1) having a high pressure hydrogen tank.

The hydrogen server 1 side has the following control parameters and checking items:
 a filling pressure, a fillable capacity, an allowable maximum temperature at the time of filling, and the like for each kind of a storage material used for the hydrogen delivery unit 2;
 a capacity of the hydrogen storage unit 2 and the maximum value of a filled amount of hydrogen gas in the hydrogen delivery unit 2; and
 a relationship curve between a filled amount and a filling time for performing efficient filling.

The hydrogen delivery unit 2 side has the following pieces of information on the hydrogen server 1:
 the kind of a storage material used for the hydrogen delivery unit 2;
 the maximum capacity of the hydrogen cartridge 21:
 an environmental temperature; and
 an internal temperature of the hydrogen cartridge 21.

In the case of connecting the hydrogen delivery unit 2 to the hydrogen server 1 for filling the hydrogen delivery unit 2 with hydrogen gas, after the hydrogen delivery unit 2 is connected to the hydrogen server 1, an operation for filling the hydrogen delivery unit 2 with hydrogen gas is started. At this time, first, the hydrogen server 1 transmits a connection check signal to the hydrogen delivery unit 2 side. It is to be noted that if any reply to the connection check signal is not transmitted from the hydrogen delivery unit 2 side to the hydrogen server 1, the hydrogen server 1 transmits an alarm and interrupts the delivery of hydrogen gas. After receiving the connection check signal, the hydrogen delivery unit 2 checks the specifications, for example, the kind of a storage material, a fillable capacity, and the like, of the hydrogen cartridge 21. The hydrogen delivery unit 2 side transmits information on the specifications to the hydrogen server 1. The hydrogen server 1 calculates a filling pressure, an allowable filled amount, and the like on the basis of the information transmitted from the hydrogen delivery unit 2 side and the previously prepared parameters, to determine the control for filling.

The hydrogen server 1 transmits a message about the start of filling to the hydrogen delivery unit 2 side and the hydrogen delivery unit 2 transmits a confirmation message about the start of filling to the hydrogen server 1. The filling of hydrogen gas is thus started in accordance with the filling control method previously determined. During the filling of hydrogen gas, the hydrogen server 1 inquires with the hydrogen delivery unit 2 at a suitable time interval about the temperatures and pressures in and out the hydrogen cartridge 21. If an abnormal temperature rise or pressure change occurs during the filling, the hydrogen server 1 immediately interrupts the filling.

At the time of termination of the above-described filling sequence, the hydrogen server 1 transmits a message about the termination of filling to the hydrogen delivery unit 2 side, and the hydrogen delivery unit 2 transmits a confirmation message about the termination of filling to the hydrogen server 1 side. The hydrogen server 1 thus closes valves including a pressure regulating valve. The hydrogen delivery unit 2 side also closes valves, and transmits the result to the hydrogen server 1 side. After confirming the termination of all the steps of filling the hydrogen delivery unit 2 with hydrogen gas, the hydrogen delivery unit 2 informs the system that it is in the removable state. The sequence of filling the hydrogen delivery unit 2 (hydrogen cartridge 21) with hydrogen gas is thus terminated.

Figure 5:
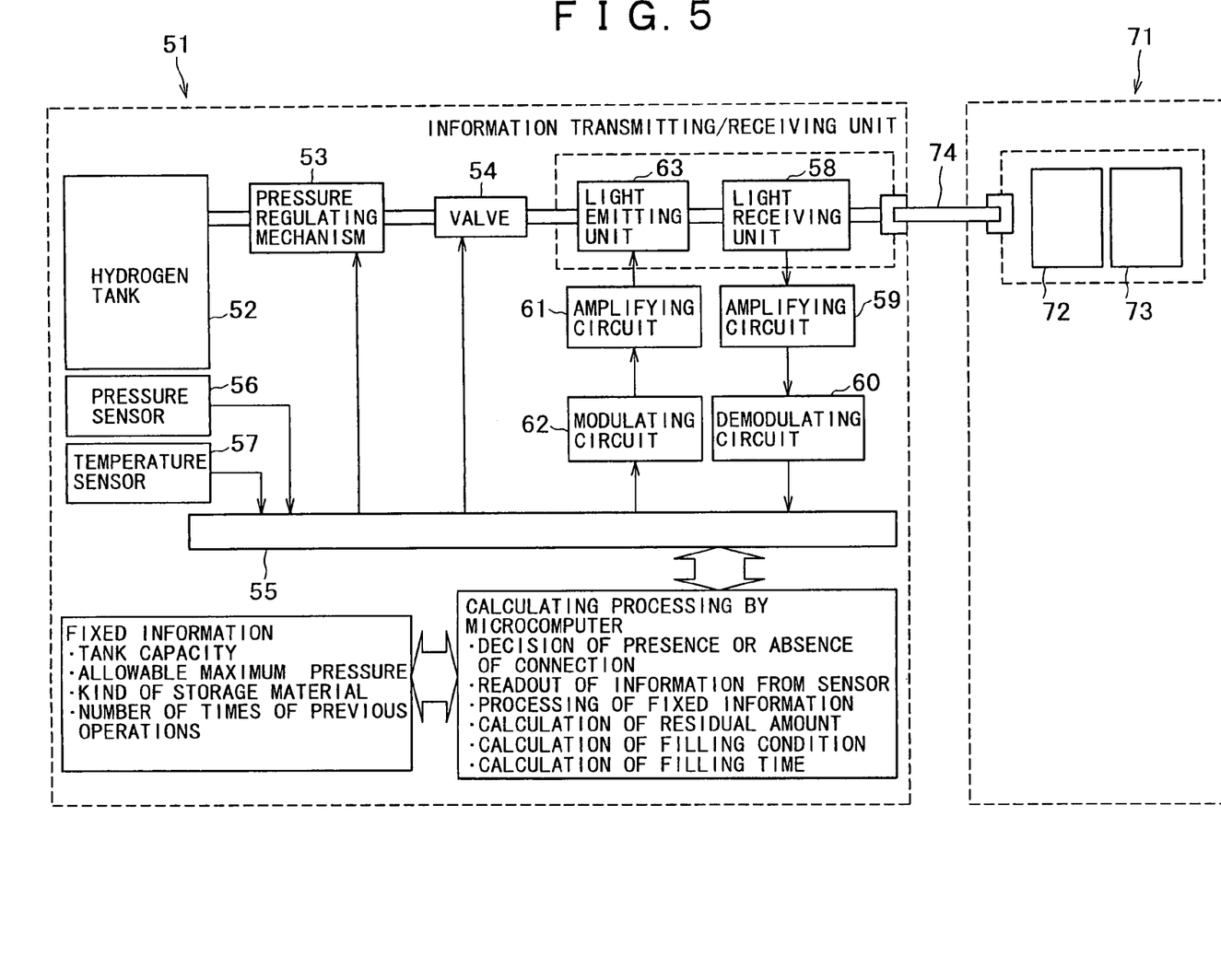
FIG. 5 is a block diagram showing one example of an optical information transmitting mechanism.

In the above-described filling sequence, the hydrogen server 1 and the hydrogen delivery unit 2 can be communicated to each other by an optical communication manner performed by making use of a hydrogen gas flow passage at the coupled section. FIG. 5 shows a configuration example of a hydrogen server and a hydrogen delivery unit, in which information is transmitted between the hydrogen server and the hydrogen delivery unit by optical communication.

As shown in FIG. 5, a hydrogen server 51 includes a hydrogen tank 52, a pressure regulating mechanism 53 for adjusting the pressure of the hydrogen tank 52, and a valve 54, wherein the pressure regulating mechanism 53 and the valve 54 are controlled by an input/output circuit 55. Information from a pressure sensor 56 and a temperature sensor 57 is inputted in the input/output circuit 55, and also a signal from a light receiving unit 58 for transmitting/receiving information between the light receiving unit 58 and a hydrogen delivery unit is inputted in the input/output circuit 55 via an amplifying circuit 59 and a demodulating circuit 60. On the contrary, a signal from the input/output circuit 55 is outputted to a light emitting unit 63 via a modulating circuit 62 and an amplifying circuit 61.

The hydrogen server 51 has pieces of fixed information on a tank capacity, an allowable maximum pressure, the kind of a storage material, the number of times of previous operations, and further has calculation processing functions such as decision of the presence or absence of connection, readout of information from the sensors, processing of the fixed information, calculation of a residual amount, calculation of a filling condition, and calculation of filling time.

On the other hand, a hydrogen delivery unit 71 includes a light receiving unit 72 and a light emitting unit 73 for communication, and enables optical transmission of information via a fuel transfer tube 74 as a flow passage of hydrogen gas. Accordingly, transmission/reception of information in the above-described filling sequence is performed by transmission/reception of signals between the light receiving unit 58 and the light emitting unit 63 in the hydrogen server 51 and the light receiving unit 72 and the light emitting unit 73 in the hydrogen delivery unit 71.

Figure 6:
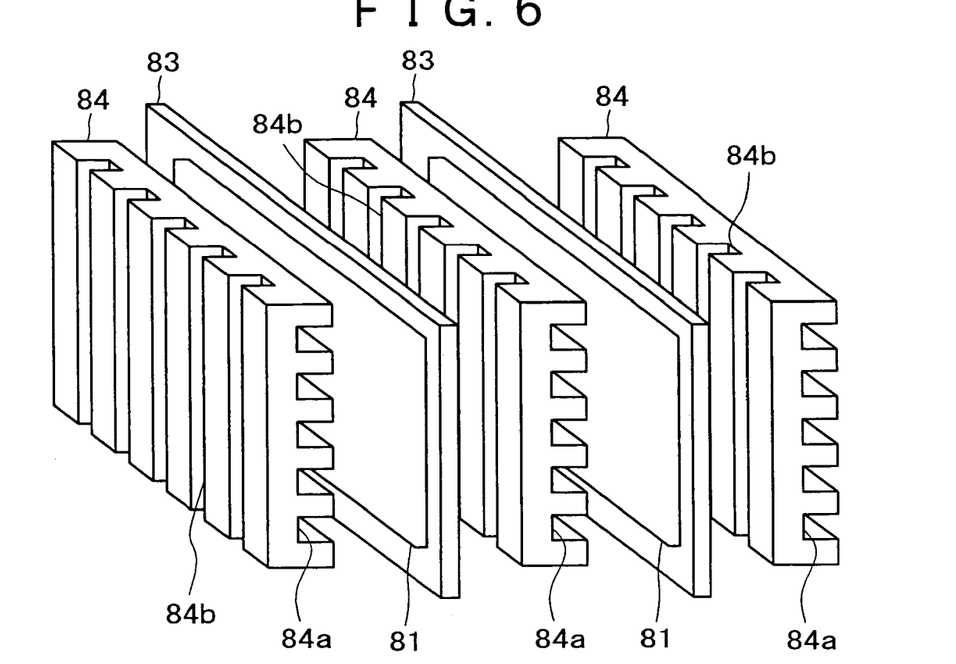
FIG. 6 is an exploded perspective view showing a basic configuration example of a fuel cell.
Figure 7:
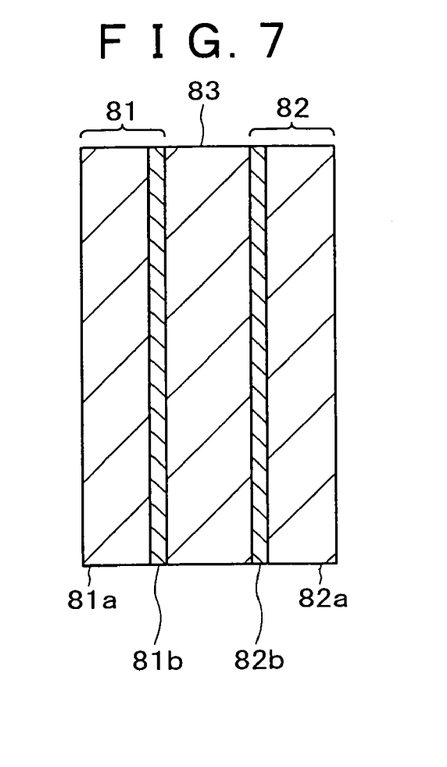
FIG. 7 is a schematic sectional view showing a configuration example of an electrode of a fuel cell.

Finally, a basic configuration of each power generation cell 3 of a fuel cell stack and a mechanism for generating an electromotive force from the power generation cell 3 will be described below. As shown in FIGS. 6 and 7, the power generation cell of the fuel cell stack is configured such that a fuel electrode 81 in contact with hydrogen as a fuel gas is overlapped to an air electrode 82 in contact with air (oxygen) via an electrolyte 83, and such a sub-assembly is sandwiched between both current collectors 84. The current collector 84 is made from dense graphic that is high in current collecting performance and is stable even in an oxidizing steam atmosphere. Horizontal grooves 84a to which hydrogen is to be supplied are formed in a surface, opposed to the fuel electrode 81, of the current collector 84, and vertical grooves 84b to which air is to be supplied are formed in a surface, opposed to the air electrode 82, of the current collector 84.

As shown in FIG. 7, the fuel electrode 81 and the air electrode 82 are overlapped to each other with the electrolyte 83 held therebetween. The fuel electrode 81 is composed of a gas diffusion electrode 81a and a catalyst layer 81b, and similarly the air electrode 82 is composed of a gas diffusion electrode 82a and a catalyst layer 82b. Each of the gas diffusion electrodes 81a and 82a is made from a porous material, and each of the catalyst layers 81b and 82b is made from a mixture of an electrolyte and carbon particles on which an electrode catalyst such as platinum is supported.

The fuel cell stack is obtained by stacking a plurality of the above-described power generation cells, which are taken as basic units (fuel cells), to each other. Such a fuel cell stack is able to output a specific voltage by operating the plurality of fuel cells connected in series.

In the fuel cell having the above-described configuration, when hydrogen gas is supplied in the horizontal grooves 84a formed in the current collector 24 so as to be in contact with the fuel electrode 21 and air (oxygen) is supplied in the grooves 84b so as to be in contact with the air electrode 82, reactions shown by the following formulas occur:

$$H_2 \rightarrow 2H^+ + 2e^- \text{ (fuel electrode 81 side)}$$

$$1/2O_2 + 2H^+ + 2e^- \rightarrow H_2O + \text{reaction heat Q (air electrode 82 side)}$$

$$H_2 + 1/2O_2 \rightarrow H_2O \text{ (as a whole)}$$

To be more specific, hydrogen is converted into protons by release of electrons on the fuel electrode 81 side. The protons migrate to the air electrode 82 side through the electrolyte 83, and react with electrons and oxygen on the air electrode 82 side. An electromotive force is generated on the basis of such an electrochemical reaction.

INDUSTRAIL APPLICABILITY

A fuel gas mediator of the present invention is able to store, display, and transmit various kinds of information, for example, on a necessary filled amount, the number of times of filling, the flow rate of a fuel gas, a residual amount of the fuel gas, and the kind of a storage material, and hence to suitably control a fuel gas server and the like on the basis of these kinds of information. The fuel gas mediator also has a temperature control mechanism, and therefore, the fuel gas mediator is able to perform temperature control, more specifically, to readily release, when a storage material in a fuel gas storing unit generates heat, the heat of the storage material.

What is claimed is:

1. A fluid fuel mediator configured to mediate transfer of fluid fuel between a fluid fuel server and a power generator, comprising:
a fluid fuel inlet in fluidic communication with the fluid fuel server;
a fluid fuel outlet in fluidic communication with the power generator;
a storage vessel configured to store fluid fuel received from the fluid fuel server; and
means for storing information related to control of the fluid fuel server to replenish the storage vessel,
means for displaying information related to the control of the fluid fuel server, and
means for transmitting information related to the control of the fluid fuel server.

2. A fluid fuel mediator according to claim 1, wherein said information related to the control of the fluid fuel server includes at least one or more of information on a necessary filled amount, information on the number of times of filling, information on a flow rate of the fluid fuel, information on a residual amount of the fluid fuel, and information on a kind of storage material.

3. A fluid fuel mediator according to claim 1, further comprising:
a flow meter on a fluid fuel flow-in side and a flow meter on a fluid fuel flow-out side.

4. A fluid fuel mediator according to claim 3, wherein said means for storing information related to the control of the fluid fuel server comprises a flow-in amount memory for storing a flow-in amount measured by said flow meter on the fluid fuel flow-in side, and a flow-out amount memory for storing a flow-out amount measured by said flow meter on the fluid fuel flow-out side; and
said means for displaying information related to the control of the fluid fuel server includes a display for calculating a residual amount on the basis of information from said flow-in amount memory and said flow-out amount memory and displaying the calculated residual amount.

5. A fluid fuel mediator according to claim 1, wherein a necessary flow rate is adjusted on the basis of information from said power generator.

6. A fluid fuel mediator according to claim 5, further comprising:
a gas flow rate information pin provided on said power generator;
wherein the necessary flow rate is adjusted by said gas flow rate information pin.

7. A fluid flow mediator according to claim 6, wherein a restriction amount of a flow-in port is adjusted by a length of said gas flow rate information pin.

8. A fluid fuel mediator according to claim 2, wherein said means for storing information related to the control of the fluid fuel server comprises a memory for storing a number of times of connection; and
said means for displaying information related to the control of the fluid fuel server comprises a display for displaying a number of times of filling of fluid fuel.

9. A fluid fuel mediator according to claim 8, wherein the number of times of connection stored in said memory for storing the number of times of connection is reset by mounting or dismounting of said storage vessel.

10. A fluid fuel mediator according to claim 8, wherein said means for transmitting information related to the control of the fluid fuel server comprises an information transmitter for transmitting information on the number of times of connection to said fluid fuel server, said information on the number of times of connection operative to adjust a delivery pressure on the fluid fuel server side.

11. A fluid fuel mediator according to claim 1, further comprising: a temperature control mechanism.

12. A fluid fuel mediator according to claim 11, wherein said temperature control mechanism is configured to control temperature by adjusting each gap between adjacent two components of a heat sink or a tilt angle of each of the adjacent two said heat sink.

13. A fluid fuel mediator according to claim 12, wherein the adjustment of the gaps and tilt angles of the adjacent two components of said heat sink is performed by using a bimetal or a shape memory alloy.

14. A fluid fuel mediator according to claim 13, wherein said temperature control mechanism includes said heat sink mounted to a coil spring made from the shape memory alloy.

15. The fluid fuel mediator according to claim 11, wherein said temperature control mechanism includes a temperature sensor and a Peltier device.

16. A fluid fuel mediator according to claim 1, wherein said storage vessel has a storage material which stores a fluid fuel.

* * * * *